Patented July 8, 1924.

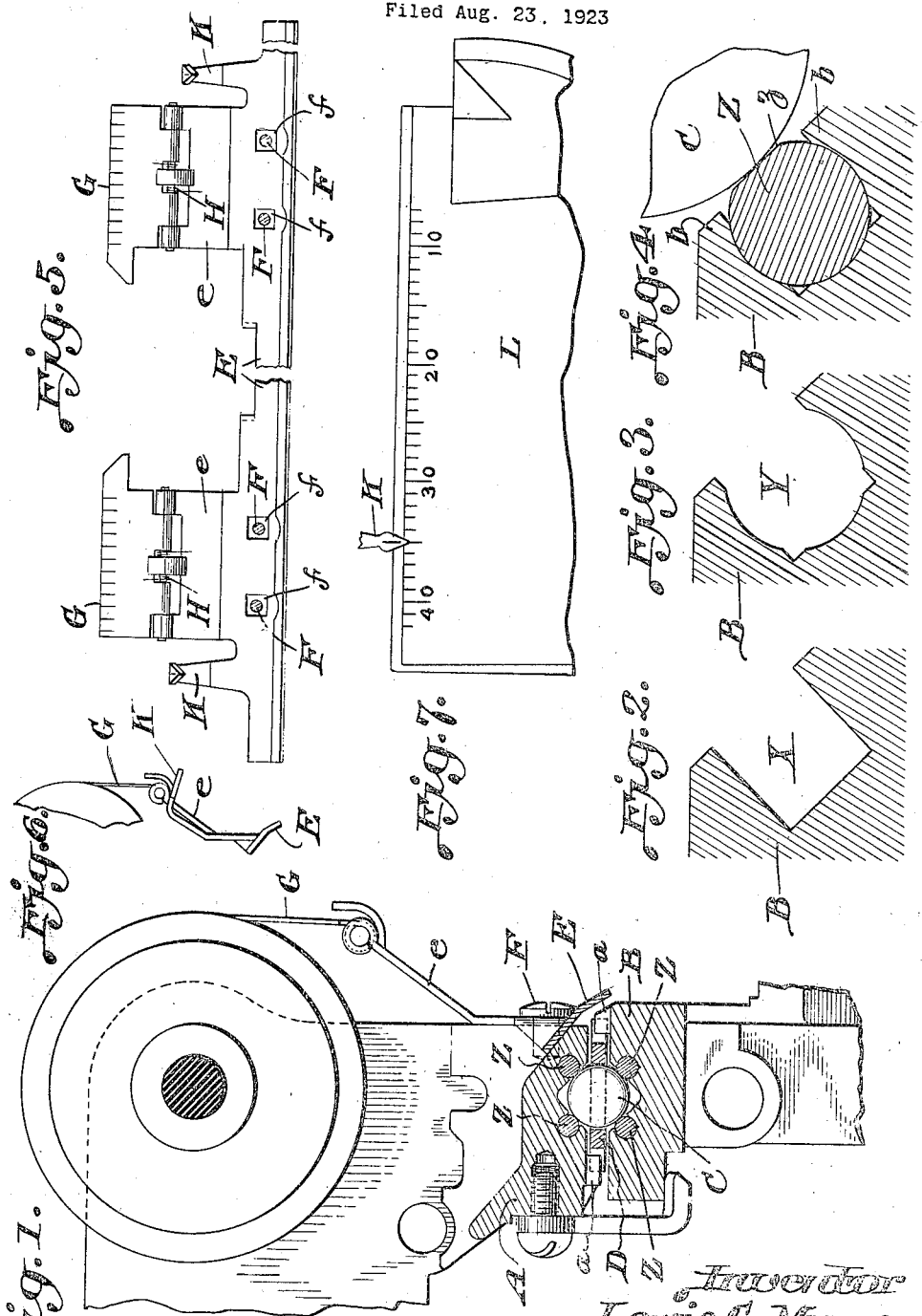

1,500,839

UNITED STATES PATENT OFFICE.

LEWIS C. MYERS, OF FREEPORT, NEW YORK, ASSIGNOR TO ROYAL TYPEWRITER COMPANY, INC., OF NEW YORK, N. Y., A CORPORATION OF NEW YORK.

TYPEWRITING MACHINE.

Application filed August 23, 1923. Serial No. 658,959.

*To all whom it may concern:*

Be it known that I, LEWIS C. MYERS, a citizen of the United States, residing at Freeport, in the county of Nassau and State of New York, have invented certain new and useful Improvements in Typewriting Machines, of which the following is a specification.

This invention relates particularly to typewriting machines in which the typewriter carriage is made to run on balls or roller bearings in order to reduce friction and to provide for the easy movement of the carriage back and forth across the machine. This is a desirable feature of the Royal standard machine.

In that machine, the carriage rail and shift rail are grooved to receive balls of hardened steel and these rails are provided with teeth, engaged by circular pinions or ball gears which travel back and forth with the balls in the grooves. In the Royal machine the balls have been made to engage directly with the walls of the grooves in the rails, and in order to avoid undue wear the rails have been made of relatively hard material. As the rails are comparatively large the expense of their manufacture has been considerable.

In the pending application for patent of Bernard J. Dowd, filed Aug. 29, 1923, No. 660,008, a construction is shown in which the carriage rail and the shift rail are provided with inserts of relatively hard material with which the balls or rollers engage, thus making it possible to employ rails made of relatively soft and less expensive material.

According to my invention, instead of using a single grooved insert in each rail I employ a plurality of inserts and mount them in the rails in a novel way, the inserts preferably being made of commercial form of round bar steel of proper size.

Another part of my invention relates to the marginal alining scales common to all Royal machines and to the dust sheds now employed in such machines. In the Royal standard machine a separate alining scale or gage is attached to the platen carriage near each end thereof and each scale is separately applied and adjusted. According to my invention the two scales are connected with each other and may be simultaneously applied to and simultaneously removed from the carriage. Preferably the scales are attached to a plate extending from end to end of the carriage which serves as a dust shed or guard for the ball bearing of the carriage. In the Royal machine the dust sheds which partially cover the type bars are provided with scales over which move pointers or index fingers attached to the carriage. According to my invention these pointers or index fingers are formed integrally with the plate which connects the alining scales and serves to protect the ball bearings.

In the accompanying drawing:—

Figure 1 is a vertical section of a portion of a typewriting machine with my improvements applied.

Figure 2 illustrates the first operation of forming a groove in a rail to receive an insert.

Figure 3 indicates the second operation in which the angular groove, shown in Figure 2, is enlarged to give circular form thereto to correspond with the circular form of the bar which serves as a bearing insert for the rail.

Figure 4 indicates how the insert or wearing bar is mounted in the rail.

Figure 5 indicates how the alining scales are connected with a dust guard for the carriage bearings and how this dust guard is formed with fingers which cooperate with the scales on the type bar dust sheds.

Figure 6 is an end view of the parts shown in Figure 5.

Figure 7 is a fragmentary view illustrating how a pointer carried by the carriage dust shed cooperates with a scale on one of the type bar dust sheds.

The carriage rail A and the shift rail B may be made of relatively soft material; that is, such rails may be made of softer material than those heretofore employed but they should of course be sufficiently strong to withstand all strains and shocks, but they need not be made of such hard material as to provide wearing surfaces for the balls interposed between them inasmuch as by my invention bearing members which engage the balls are inserted in the grooves of the rails. Broadly this feature is shown, described and claimed in the application of Bernard J. Dowd above referred to; but in that application each rail is provided with a single insert of novel form while according to my invention each rail is provided with a plurality of inserts and these are mounted in a novel way.

In carrying out my invention, I preferably form two rectangular grooves in each rail in the manner indicated at X in Figure 2 and I then, by a suitable tool, broach the walls of the grooves to give a circular form thereto as indicated at Y in Figure 3. In the grooves Y I insert bars Z of the hardest obtainable material, such as hardened steel, which are driven endwise into the grooves so as to be firmly secured therein, or the rails may be heated to cause expansion before the inserts are applied and allowed to cool after the inserts are in proper position. The bars Z may be ground at $z$ to present bearing surfaces for the balls C. It will be observed that the bars Z are held against sidewise movement by the overlapping lips $b$ of the rails. The balls are properly mounted between the rails in the manner shown in Figure 1, being carried by pinions D which mesh with teeth $a$ formed on the rails. It will be observed that each rail is equipped with a plurality of inserts and that each insert is made of a commercial form of bar steel. In this way the cost of manufacture is largely reduced.

In order to protect the bearings from dust and erasures, I employ a dust shed or plate E preferably made of sheet metal, which is attached to the carriage rail by screws F which extend through enlarged openings $f$ in the plate so that the position of the plate may be properly adjusted. The Royal machine is equipped with marginal alining scales similar to those shown in Figure 5, but heretofore these scales have been separately applied to the machine. According to my invention the dust shed E is formed with flanges $e$ to which the scales G are connected. The scales are pivotally connected, as indicated, to the flanges and are pressed towards the platen by springs H in the usual way. In this way the dust shed and the alining scales are made a single unit and may be together applied to or removed from the machine. The cost of manufacture and time in applying these devices to the carriage is thus considerably reduced.

I also add to this unit pointers K which cooperate with scales on the type bar dust sheds L. These pointers may be formed integrally with the plate E. In this way I combine in a single unit or element a dust shed, marginal alining scales and scale pointers which may be constructed in a very economical way and may be quickly applied to or removed from the machine.

I claim as my invention:

1. A bearing for a typewriting machine comprising balls or rollers and rails between which the balls are mounted each provided with a plurality of wearing members with which the rails engage.

2. A bearing for a typewriter machine comprising balls or rollers and rails between which the balls are mounted each provided with a plurality of wearing members having wearing surfaces with which the balls engage.

3. A bearing for a typewriter machine comprising balls or rollers and grooved rails between which the balls are mounted each provided with a plurality of wearing members arranged in the grooves with which the balls engage.

4. In a typewriter carriage a shift rail formed with a plurality of longitudinal grooves and provided with inserted wearing members which are locked in the grooves of the rail.

5. In a typewriting machine a carriage rail formed with a plurality of longitudinal grooves and provided with inserted wearing members which are locked in the grooves of the rail.

6. A bearing for a typewriter carriage comprising balls or rollers and rails between which the balls are mounted each provided with a plurality of wearing members having wearing faces which engage the balls.

7. A bearing for a typewriter machine comprising balls or rollers and rails between which the balls are mounted provided with inserted bar steel wearing members of commercial shape with which the balls engage.

8. In a typewriting machine, bearing rails for the carriage each formed with a plurality of longitudinal grooves containing inserts of relatively hard material engaging balls or rollers mounted between the rails.

9. A typewriting machine equipped with rails of relatively soft material each reinforced or strengthened by a plurality of wearing members which are locked in grooves in the rails.

10. In a typewriting machine, the combination with the carriage rail and the shift rail of ball bearings interposed between the rails, a dust shed or plate for protecting the bearings and which is attached to the carriage rail, and marginal alining scales mounted on and connected with each other by said dust shed.

11. The combination with the carriage rail and the shift rail of a typewriting machine of a type bar dust shed, ball bearings interposed between the carriage rail and the shift rail, a dust shed or plate for the ball bearings, and pointers or index fingers cooperating with the type bar dust sheds and which are carried by the dust shed of the ball bearings.

12. In a typewriting machine, a unit which is as a whole attached to or removed from the machine, comprising a dust shed, two alining scales and two pointers, the alining scales and pointers being permanently connected to said dust shed.

13. In a typewriting machine, a unit or element which as a whole may be applied to or removed from the machine and which cooperates with the typewriter carriage having ball bearings interposed between the shift rail and the carriage rail and with type bar dust sheds having scales thereon, comprising a dust shed for the ball bearings which carries alining scales at opposite ends and pointers which cooperate with the scales on the type bar dust sheds.

In testimony whereof, I have hereunto subscribed my name.

LEWIS C. MYERS.